United States Patent [19]

Truax

[11] Patent Number: 4,502,785

[45] Date of Patent: Mar. 5, 1985

[54] SURFACE PROFILING TECHNIQUE

[75] Inventor: Bruce E. Truax, Durham Township, Middlesex County, Conn.

[73] Assignee: AT&T Technologies, Inc., New York, N.Y.

[21] Appl. No.: 298,220

[22] Filed: Aug. 31, 1981

[51] Int. Cl.$^3$ .............................................. G01B 11/24
[52] U.S. Cl. ......................................... 356/376; 356/1
[58] Field of Search .................... 356/1, 375, 376, 372

[56] References Cited

U.S. PATENT DOCUMENTS

| | | | |
|---|---|---|---|
| 3,347,130 | 10/1967 | Seibel | 356/376 |
| 3,523,736 | 8/1970 | Bottomley | 356/372 |
| 3,817,619 | 6/1974 | Kawahara | 356/1 |
| 3,895,870 | 7/1975 | Cullen et al. | 356/1 |
| 4,027,978 | 6/1977 | Yamamoto et al. | 356/393 |
| 4,113,389 | 9/1978 | Kaye | 356/387 |
| 4,125,317 | 11/1978 | Gordon et al. | 356/376 |
| 4,147,433 | 4/1979 | Drinkuth | 356/376 |
| 4,325,639 | 4/1982 | Richter | 356/1 |

*Primary Examiner*—R. A. Rosenberger
*Attorney, Agent, or Firm*—D. J. Kirk

[57] ABSTRACT

A narrow beam of light (26) is directed at a beamsplitter (12) at an incident angle ($\theta$) thereto. A portion (28) of the beam (26) passes through the beamsplitter (12) and is reflected from a first mirror (22) while a portion (29) of the beam (26) is reflected from the beamsplitter (12) and directed onto and reflected by a second mirror (24). The beams (28, 29) reflected from the first and second mirrors (22, 24) intersect at a reference plane (R). The incident angle $\theta$ of the light beam (26) is then varied until the reflected beams intersect on the surface of an object (32) along the plane of symmetry of the system. The known variation of the incident angle, $\Delta\theta$, provides sufficient information to determine the distance of the surface of the object (32) from the reference plane (R). The object 32 is then moved in an incremental fashion and $\Delta\theta$ determined for each step to ascertain the surface profile of the object.

6 Claims, 5 Drawing Figures

SURFACE PROFILING TECHNIQUE

TECHNICAL FIELD

The instant invention is directed to a technique for forming a profile of a surface of an object.

BACKGROUND OF THE INVENTION

Forming the profile of complex surfaces in manufacturing environments is a time consuming, expensive, labor intensive operation. Unfortunately, it is often an indispensable part of the manufacturing process. Most often surface profiling is done point by point using contact measuring devices. The major advantage of such techniques is that by using a variety of measuring devices any desired dimension can be found, even on the most complex parts. The major disadvantages are long measurement times and the fact that mechanical contact must be made with sometimes fragile or deformable parts. To overcome these difficulties various optical concepts have been tried. None of these schemes has found widespread acceptance, due primarily to the limited number of surface types each can accommodate, as well as the point by point data reduction required by the non-automated techniques. Another problem encountered by all optical techniques is shadowing caused by protruding features or steep edges on the object. This shadowing makes it necessary to use multiple views in order to contour the whole surface.

Accordingly, there is a need for an automated, optical surface profiling instrument capable of measuring a wide variety of surfaces while minimizing the shadowing problem.

SUMMARY OF THE INVENTION

The instant invention overcomes the foregoing problems by a method of determining the profile of the surface of an object, comprising the steps of: (a) impinging a narrow beam of light on a beamsplitter at a known incidence angle $\theta$ thereto to reflect a first portion of the beam therefrom while permitting a second portion of the beam to pass therethrough: (b) directing the first and second beam portions along first and second paths symmetric to the plane of the beamsplitter and in such a direction as to intersect in said plane of symmetry; (c) adjusting the distance $\Delta Z$ between said beam intersection and the surface of the object until at least one of said first or second beam portions impinges on the surface of the object intersected by said plane of symmetry; (d) determining the distance $\Delta Z$; and repeating steps (c) and (d) to determine the profile of the surface of the object at other locations.

DETAILED DESCRIPTION

Figure 1:
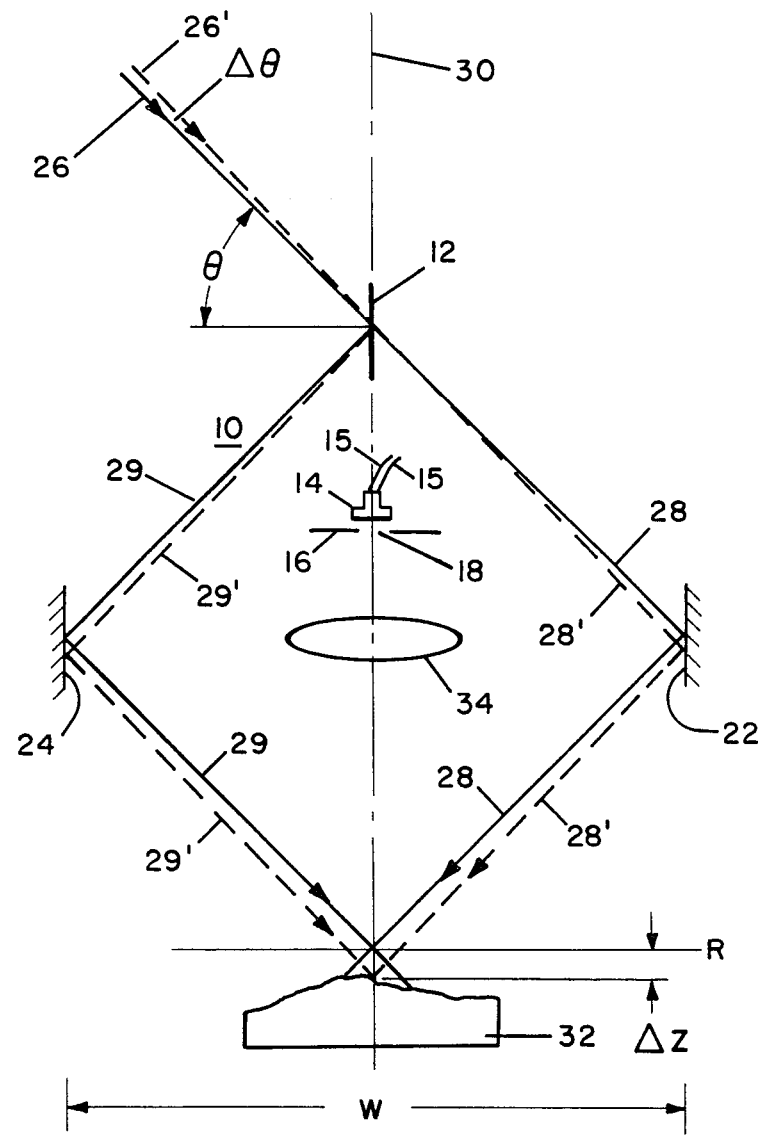
FIG. 1 is an optical schematic of the instant profiling technique.

FIG. 1 is a schematic of an exemplary embodiment of the instant surface profiling system 10. The system 10 is comprised of a beamsplitter 12, a light detector 14 having output leads 15—15, a first mask 16 having a slit 18 therein and first and second fixedly mounted mirrors 22 and 24, respectively. An incoming beam of light 26 is split into a first beam 28 passing through the beamsplitter 12 and a second beam 29 reflected by the beamsplitter. The beams 28 and 29 are directed on symmetric paths by the first and second mirrors 22 and 24 about a plane of symmetry 30 which is defined by the plane of the beamsplitter 12 and also passes through the slit 18. If the beam 26 is originally incident on the beamsplitter 12 at an angle $\theta$ then the two symmetric beams 28 and 29 intersect each other and the plane of symmetry 30 at a plane R which defines a horizontal reference plane normal to the plane of symmetry.

The surface of an object 32, to be profiled, is placed an unknown distance $\Delta Z$ from the reference plane R and the incident angle $\theta$ is varied until the intersection point of the two beams 28' and 29' with the plane of symmetry 30 forms a spot of light on the surface. The surface of the object 32 should be diffuse in order to scatter light thereon. Highly reflective surfaces may be roughened or coated with diffuse material to enhance the scattering of the impinging light. A lens 34 is followed by the slit 18 through which the detector 14 monitors the surface of the object 32 to determine when the light beams 22 and 24 intersect on the surface of the object 32 on the plane of symmetry 30. If the incident angle change is given by $\Delta\theta$ then $\Delta Z$ can be found using the equation $$\Delta Z = W[\tan(\theta + \Delta\theta) - \tan\theta] \quad (1)$$

where W is the distance between the mirrors 22 and 24. Accordingly, by translating the object 32 in the X,Y plane (i.e., parallel to plane R) and measuring $\Delta\theta$, $\Delta Z$ can be calculated for each point to determine the surface profile of the object 32.

Figure 2:
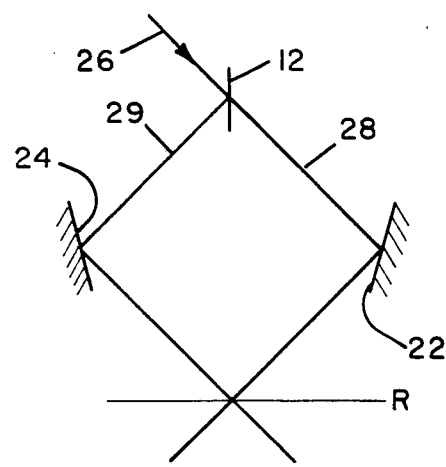
FIG. 2 is an optical schematic of an alternate profiling technique embodying the instant invention.

It should be noted that equation (1) applies to the simple case where the plane of symmetry 30 of the system is coincident with the plane containing the beamsplitter 12 and the surface of the mirrors 22 and 24 are parallel with each other and with the plane of the beamsplitter. However, the instant technique is not limited to the mirrors 22 and 24 being parallel as long as they are symmetric with respect to the plane of the symmetry 30. Such an alternative is schematically shown in FIG. 2. Accordingly, it should be clear that the mirrors 22 and 24 need only be symmetric about the plane of the beamsplitter 12 such that when beams 28 and 29 are reflected therefrom they will intersect at a point on the plane of symmetry 30.

Figure 3:
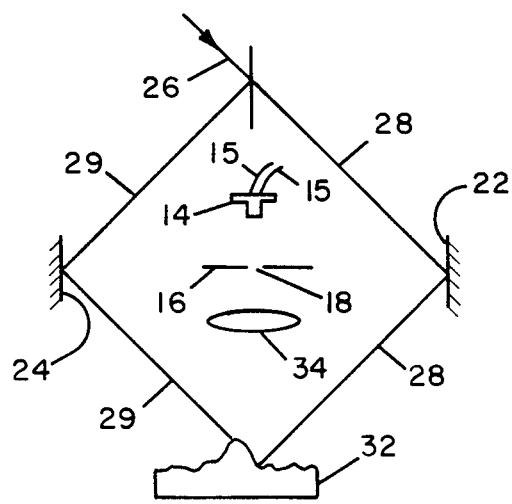
FIG. 3 depicts the instant invention used to profile a surface wherein shadowing takes place.

Advantageously, angle $\Delta\theta$ can be determined just as accurately using only one of the beams 28 or 29. Therefore, if one beam is shadowed or blocked due to the contours of the surface of the object 32, as shown in FIG. 3, the displacement $\Delta Z$ can still be determined. Accordingly, relatively rough surface contours having "hills" and "valleys" can be profiled using the instant technique. Depending on the initial angle $\theta$, there will always be a limit to the allowable aspect ratio of any depression that can be determined. For instance, with the parallel mirror configuration shown in FIG. 1 the aspect ratio limit is given by equation (2) where h is the depth and l is the width of the depression.

$$\frac{h}{l} = \frac{1}{2} \tan \theta \qquad (2)$$

Figure 4:
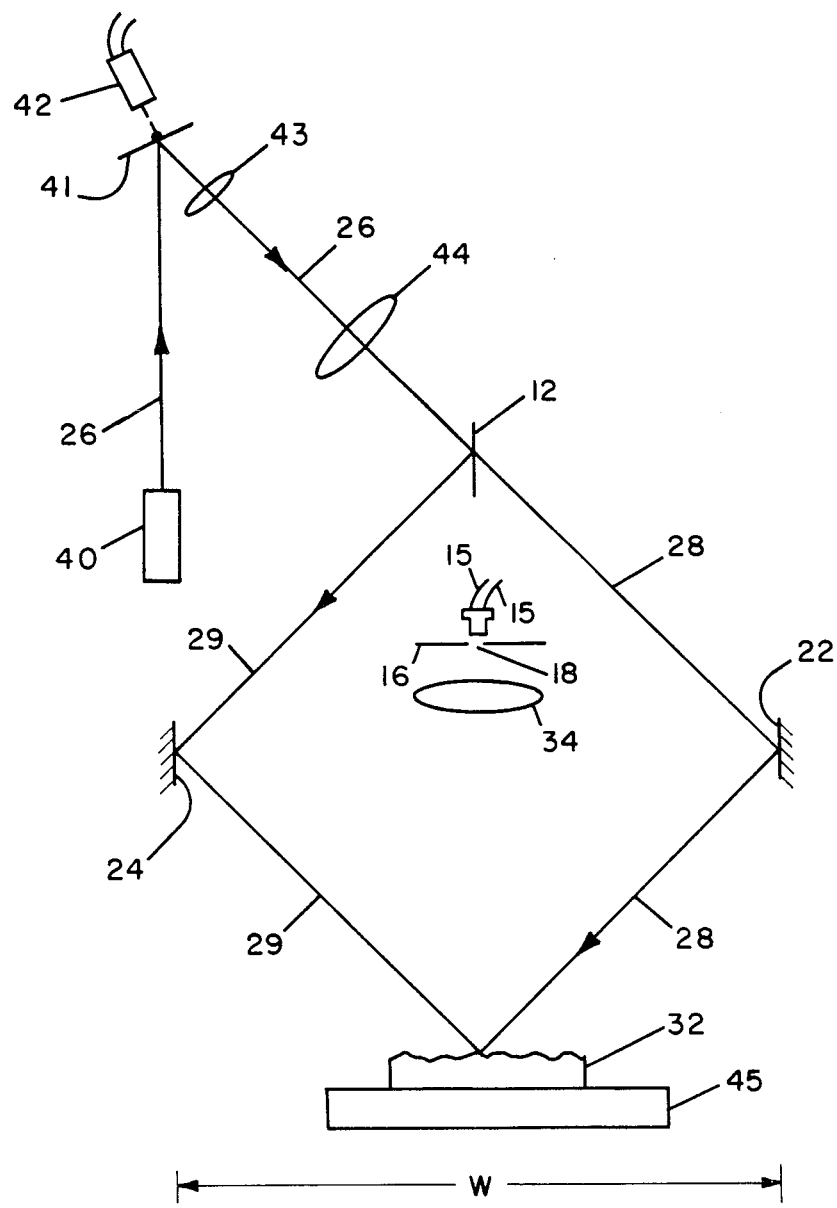
FIG. 4 depicts scanning and focusing optics used to implement the instant techniques.

FIG. 4 shows the scanning and focusing optics used in an exemplary embodiment to scan the beam 26 and optimize the system resolution. The incoming laser beam 26, from a laser 40, (e.g., HeNe) is directed towards a rotatable mirror 41 controlled by a position sensing galvanometer 42. The mirror 41 redirects the beam 26 towards the beamsplitter 12 via lenses 43 and 44.

The lens 43 is positioned one focal length from the rotatable mirror 41 and the lens 44 is place one focal length from the beamsplitter 12. Such an arrangement permits the beam 26, incident on the beamsplitter 12, to pivot about a fixed point on the beamsplitter as the angle of incidence is changed. Otherwise, changes in the position of the mirror 41 will cause the beam 26 to "walk about" on the surface of the beamsplitter 12 and equation (1) would not apply. The instant arrangement of the lenses 43 and 44 also ensures that the beam spot impinging on the beamsplitter 12 is an image of the laser spot impinging on the rotatable mirror 41 regardless of the spacing between the lenses.

The spacing between the lenses 43 and 44 is adjusted to optimize the resolution of the system. The spacing essentially controls the f-number (and thus, the minimum laser beam diameter) of the focused beam 26.

As can be seen in FIG. 4, the object 32 to be profiled is mounted on a motor driven horizontal X-Y table 45. The table 45 is driven in horizontal steps, stopping at each point which is to be measured. Once the movement of table 45 has stopped, the position sensing galvanometer 42 drives the scanning mirror 41 through a range of angles sufficient to determine the distance of the surface of the object 32 from the reference plane R as hereinbefore described in relation to FIG. 1. As the rotatable mirror 41 scans, an electrical pulse will be generated at the output leads 15—15 of the light detector 14, behind the slit 18, when at least one of the beams 28 or 29 illuminates the surface of the object 32 at the intersection of the plane of symmetry 30. At the peak of this pulse, the galvanometer 41 is sampled to obtain positional information of the mirror 42. With the mirror position information (i.e., $\Delta\theta$), equation (1) can be used to calculate the corresponding displacement $\Delta Z$.

Using the motorized X-Y table 45 with position output and a fast galvanometer 42 capable of producing a 200 Hz ramped waveform, measurement speeds of 200 points per second are possible. Because of its simplicity, the output information relating to the position of the galvanometer controlled mirror 41, the output signal from the light detector 14 and the position of the X-Y table 45 can be fed into a computer (not shown) and the profile of the surface of the object 32 calculated using the formula in equation (1). The output from the computer may then be displayed on a CRT, a topographical printout or the like.

Figure 5:
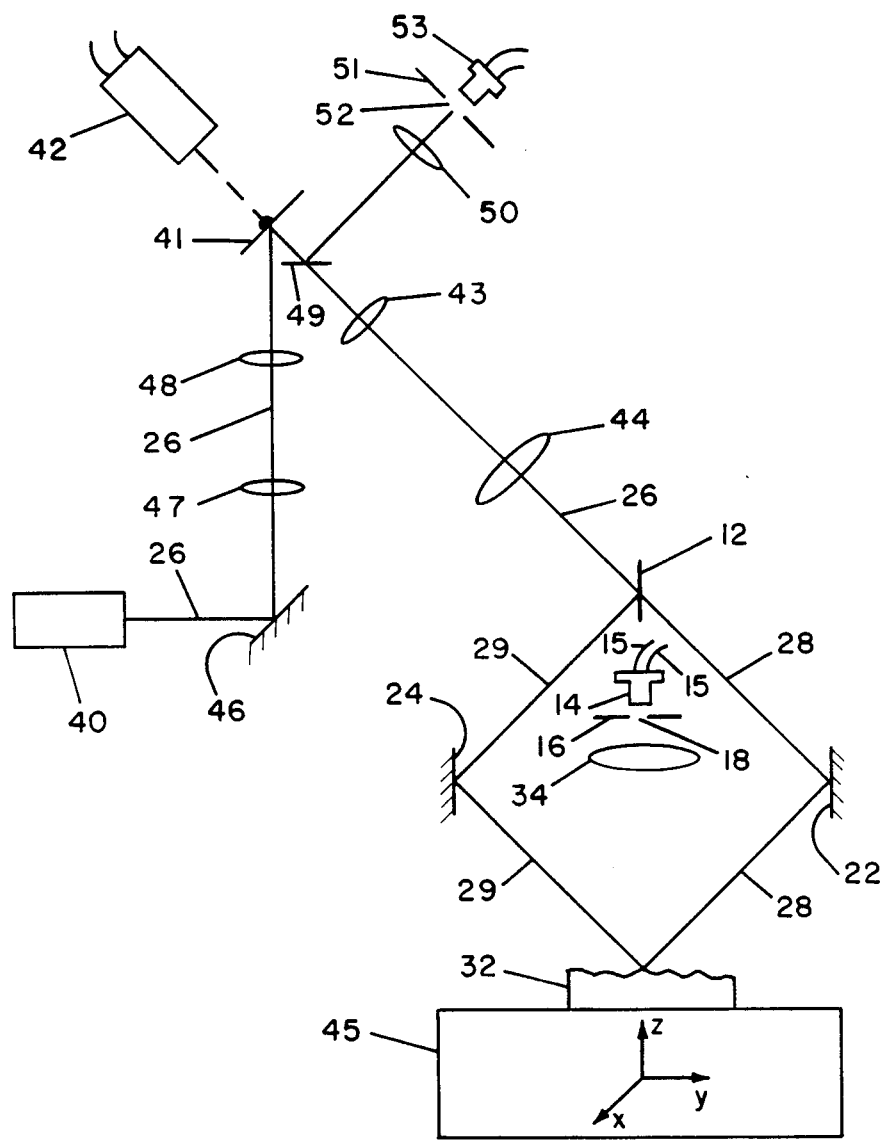
FIG. 5 shows a complete optical system embodying the invention.

To aid in identifying the maximum of the optical signals at the detector 14, the light beam 26 is continuously dithered at 15,750 Hz by a resonant scanner 46 as shown in FIG. 5. The beam 26 reflected from the scanner 46 is transferred to the mirror 41, controlled by the position sensing galvanometer 42, by way of a 1:1 telecentric lens system consisting of two 50 mm lenses 47 and 48.

The dithering of the beam 26 causes the beam intersection to move back and forth along the plane of symmetry defined by the plane containing the beamsplitter 12. If the surface of the object 32 lies within the range of the scan of the beam 26, a repetitive electrical signal may be observed by the light detector 14. The frequency of this signal will be 15,750 Hz. Advantageously, by dithering the beam continuously it is easier to detect for an AC signal rather than a DC level and the alternating signal is more immune from common noise problems. With the instant technique, one simply needs to detect the peak of the signal and not its absolute value. Additionally, the signal is repetitive so that phase-locked signal detection techniques can be employed, offering further immunity from noise.

Inasmuch as the 15,750 Hz scanner 46 operates at such a high frequency, the limits to its angular excursion are necessarily small. As a result, the linear excursion of the scanning beam 26-object 32 intersection is relatively small (e.g., ±2.5 mm). In order to quickly locate the surface of an object 32 that lies outside the range of the resonant scan, the position sensing galvanometer 42 is used to displace the position of the resonant scan. Since the range of the position sensing galvanometer, in an exemplary embodiment, is ±7°, the surface of the object 32 may be detected if it lies within approximately ±10 mm of the reference plane R. Although the position sensing galvanometer 42 is much slower than the resonant scanner 46 it is still faster than repositioning the object 32 using the motorized X-Y table 45.

In essence, the resonant scanner 46 dithers the intersection of the beams to provide an "oscillating probe." This probe can be quickly and conveniently positioned (if necessary) by means of the position sensing galvanometer. Whenever the "oscillating probe" encounters the surface of the object 32 in the plane of symmetry 30, a repetitive signal is seen at the output of the light detector 14.

For optimum resolution it is necessary that the point on the surface of the object 32 being measured always be in the optimal focal plane of the beams. Such a scheme can be implemented by adding a motor drive to drive the object 32 in the Z-axis direction along with apparatus to locate the reference angle $\theta$ corresponding to the optimal focal plane. With such a setup, for each point being measured, the object 32 is driven along the Z axis until the peak of the pulse from detector 14 occurs when $\Delta\theta$ is zero, thus minimizing the spot size on the object 32. Before the object 32 is moved onto a new point the X, Y and Z coordinates of the location thereof are stored in the computer. In this way the surface of the object 32 can be profiled with a high degree of resolution. However, because of its additional complexity this method is slower and requires a more sophisticated optical system.

The additional components needed for such high resolution profiling are illustrated in FIG. 5. A second beamsplitter 49, a lens 50, a second mask 51 having a slit 52 and a reference light detector 53 directly following the galvanometer controlled mirror 42 are used to locate the reference angle $\theta$. The slit 52 and the light detector 53 can be moved laterally.

In order to determine the position of the surface of the object 32, one must know the exact position of both the resonant scanning mirror 46 and the galvanometer controlled mirror 42 during the peak of the output signal from the object detector 14. To accomplish this end a small portion (e.g., 8%) of the scanned beam 26 is reflected by the beamsplitter 49 and is focused by the lens 50 onto the mask 51. As the angle of the beam 26 changes the focused beam is scanned across the mask 51. The reference light detector 53 generates an electrical pulse at its output each time the scanning beam passes through the slit 52 in the mask 51. The slit 52 is positioned so that the peak of this "reference" pulse occurs when the resonant scanner 46 is at its null position. Then, by definition, the peak of the reference pulse occurs at the same time as the scanning beam intersection passes through the reference plane R.

Accordingly, the goal of this technique is to position the surface of the object 32 (via X-Y-Z motorized stage 45) so that the surface of the object illuminated by the beams 28 and/or 29 lies in the reference plane R. When this condition is achieved the peak of the pulse from the light detector 14 will occur at the same time as the peak of the pulse from the reference light detector 53. A computer, not shown, monitors the occurrence of output pulses of detectors 14 and 53 and moves the object 32, via the stages 45, until the peaks of the pulses occur simultaneously. For each surface location (X,Y) the computer determines (Z) from positional information obtained from the motorized table 45. Motorized tables with 4 μm position resolution are well known and readily available.

The electronics which control the instrument are well known and are primarily digital and are based on a PDP-11/03 minicomputer (not shown). The computer is equipped with both analog and digital input/output devices to enable easy interfacing of the galvanometer, positioning table 45 and the detectors 14 and 53 with the computer. In addition to processing signals from the detectors 14 and 53 and controlling the galvanometer and positioning table 45, the computer also acquires the profile data and presents it to the user in a meaningful way.

In the exemplary embodiment the parameters of the apparatus used are summarized in Table I:

TABLE I

Lens 43, f=24 mm
Lens 44, f=400 mm
Lens 50, f=50 mm
$\theta = 45°$
W=381 mm
ΔZ range=23 mm The remainder of the optical components are as follows:
Lenses 47 and 48—50 mm focal length, 12 mm in diameter
Lens 34—50 mm focal length, f/2.8
Beam spot size=0.025 mm diameter.

Once the surface profile has been measured and stored in the computer it must be displayed for the operator. This display can be in one of two forms. The first form is a listing of the X, Y, Z coordinates as they were measured. The second form is a perspective plot of the data with adjustable orientation and scale. Additionally, the measured profile may be compared with a standard or reference profile stored in memory for inspection operations.

It is to be understood that the embodiments described herein are merely illustrative of the principles of the invention. Various modifications may be made thereto by persons skilled in the art which will embody the principles of the invention and will fall within the spirit and scope thereof.

What is claimed is:

1. A method of determining the profile of the surface of an object, comprising the steps of:
    (a) impinging a narrow beam of light on a beamsplitter at a known incident angle ($\theta$) thereto to reflect a first portion of the beam therefrom while permitting a second portion of the beam to pass therethrough;
    (b) directing the first and second beam portions along first and second paths symmetric to the plane of the beamsplitter and in such a direction as to intersect in said plane of symmetry;
    (c) adjusting the distance (ΔZ) between said beam intersection and the surface of said object;
    (d) varying the incident angle ($\theta$) until at least one of said first or second beam portions impinges on the surface of the object intersected by said plane of symmetry;
    (e) determining the distance (ΔZ) from a reference plane (R), normal to the plane of symmetry, to the surface of the object based upon the change (Δ$\theta$) of the incident angle ($\theta$) of the beam; and
    (f) repeating steps (c), (d) and (e) to determine the profile of the surface of the object at other locations.

2. The method as set forth in claim 1, wherein the distance (ΔZ) is determined in accordance with the following equation:

$$\Delta Z = W[\tan(\theta + \Delta\theta) - \tan\theta]$$

where W is the distance between first and second mirrors, each mirror being mounted on opposite sides of the plane of symmetry to reflect the first and second beam portions, respectively, towards said plane of symmetry.

3. The method as set forth in claim 1, comprising the further step of:
    (f) comparing the profile of the object determined in step (e) with a standard profile to determine the acceptability thereof.

4. An apparatus for determining the profile of the surface of an object, comprising:
    means for impinging a narrow beam of light on a beamsplitter at a known incidence angle ($\theta$) thereto to reflect a first portion of the beam therefrom while permitting a second portion of the beam to pass therethrough;
    means for directing the first and second beam portions along first and second paths symmetric to the plane of the beamsplitter and in such a direction as to intersect in said plane of symmetry;
    means for adjusting the distance (ΔZ) between said beam intersection and the surface of the object;
    means for varying the incident angle ($\theta$) until at least one of said first or second beam portions impinges on the surface of the object intersected by said plane of symmetry;
    means for determining the distance (ΔZ) from a reference plane (R), normal to the plane of symmetry, to the surface of the object based upon the change (Δ$\theta$) of the incident angle ($\theta$) of the beam; and
    means for repetitively repositioning the object to determine the distance (ΔZ) for each position to form a profile of the surface of the object.

5. The apparatus as set forth in claim 4, wherein the distance (ΔZ) is determined in accordance with the following equation:

$$\Delta Z = W[\tan(\theta + \Delta\theta) - \tan\theta]$$

where W is the distance between first and second mirrors, each mirror being mounted on opposite sides of the plane of symmetry to reflect the first and second beam portions, respectively, towards said plane of symmetry.

6. The apparatus as set forth in claim 4, comprising:
means for comparing the profile of the object with a standard profile to determine the acceptability thereof.

* * * * *